(12) United States Patent
Rudin

(10) Patent No.: US 9,554,265 B1
(45) Date of Patent: *Jan. 24, 2017

(54) METHODS AND SYSTEMS FOR FACILITATING DATA COMMUNICATION

(71) Applicant: Seth A. Rudin, Boston, MA (US)

(72) Inventor: Seth A. Rudin, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,128

(22) Filed: Feb. 4, 2016

Related U.S. Application Data

(63) Continuation of application No. 13/481,791, filed on May 26, 2012, now Pat. No. 9,295,098.

(51) Int. Cl.
| | |
|---|---|
| H04L 29/06 | (2006.01) |
| G06F 15/16 | (2006.01) |
| H04W 84/18 | (2009.01) |
| H04W 8/08 | (2009.01) |
| H04W 4/02 | (2009.01) |

(52) U.S. Cl.
CPC ............ *H04W 8/08* (2013.01); *H04W 4/023* (2013.01)

(58) Field of Classification Search
CPC ...... H04W 84/18; H04W 88/06; H04W 76/02; H04M 1/7253; H04M 2250/02
See application file for complete search history.

(56) References Cited

U.S. PATENT DOCUMENTS

| | | | | |
|---|---|---|---|---|
| 7,130,622 | B2* | 10/2006 | Vanska | G06F 8/62 455/414.1 |
| 7,769,009 | B1 | 8/2010 | Katzer et al. | |
| 8,224,334 | B1* | 7/2012 | White | H04W 8/12 370/360 |
| 9,106,477 | B1* | 8/2015 | Youngs | H04L 29/06653 |
| 2009/0157512 | A1* | 6/2009 | King | G06Q 10/10 705/14.27 |
| 2009/0209202 | A1* | 8/2009 | Martini | H04W 12/02 455/41.2 |
| 2010/0096989 | A1* | 4/2010 | Roebke | B64D 47/06 315/77 |
| 2010/0097989 | A1* | 4/2010 | Huang | H04W 4/02 370/328 |
| 2011/0154014 | A1* | 6/2011 | Thorn | H04M 1/7253 713/150 |

OTHER PUBLICATIONS

Sarah Roberts, "Even After Supreme Court GPS Decision, Feds Still Want Warrantless Cell Phone Tracking", American Civil Liberties Union, "Speech, Privacy and Technology Project" Article, Mar. 19, 2012, published on www.aclu.org, available at "https://www.aclu.org/blog/technology-and-liberty/even-after-supreme-court-gps-decision-feds-still-want-warrantless-cell" (last accessed Jan. 24, 2014).

(Continued)

*Primary Examiner* — Nguyen Vo
*Assistant Examiner* — Ralph H Justus

(57) ABSTRACT

In accordance with one or more embodiments of the invention, methods and systems for facilitating data communication are presented. Requests to communicate data are received that include data indicative of a location of a target remote mobile computing device. A location to be searched for a target devices is determined, and location-based data of mobile devices is accessed. Potential target mobile devices are identified and data consistent with the request is sent to one or more potential targets.

20 Claims, 3 Drawing Sheets

(56) References Cited

OTHER PUBLICATIONS

American Civil Liberties Union, "Cell Phone Location Tracking Request Response—Cell Phone Company Data Retention Chart", published on www.aclu.org at least as early as Apr. 24, 2012, available at "https://www.aclu.org/cell-phone-location-tracking-request-response-cell-phone-company-data-retention-chart" (last accessed Jan. 24, 2014).

American Civil Liberties Union, "ACLU Releases Cell Phone Tracking Documents From Some 200 Police Departments Nationwide, Results Show Pervasive and Frequent Violations of Americans' Privacy Rights", Apr. 2, 2012, published on www.aclu.org, available at "https://www.aclu.org/national-security/aclu-releases-cell-phone-tracking-documents-some-200-police-departments-nationwide" (last accessed Jan. 24, 2014).

American Civil Liberties Union, "Cell Phone Location Tracking Public Records Request", Apr. 4, 2012, published on www.aclu.org, available at "https://www.aclu.org/protecting-civil-liberties-digital-age/cell-phone-location-tracking-public-records-request" (last accessed Jan. 24, 2014).

Testimony of Professor Matt Blaze, House Committed on the Judiciary, "Subcommittee on the Constitution, Civil Rights, and Civil Liberties", "Hearing on ECPA Reform and the Revolution in Location Based Technologies and Services", Jun. 24, 2010, available at "http://www.crypto.com/papers/blaze-judiciary-20100624.pdf" (last accessed Jan. 24, 2014).

Supreme Court of the United States, Slip Opinion, Oct. Term 2011, Syllabus, *United States* v. *Jones*, Certiorari to the United States Court of Appeals for the District of Columbia Circuit, No. 10-1259, Argued Nov. 8, 2011, Decided Jan. 23, 2012, available at "https://www.eff.org/files/filenode/scotusjones.pdf" (last accessed Jan. 24, 2014).

Final Office Action, U.S. Appl. No. 13/481,792, Mail Date Sep. 25, 2014.

Non-Final Office Action, U.S. Appl. No. 13/481,791, Mail Date Apr. 22, 2015.

\* cited by examiner

US 9,554,265 B1

METHODS AND SYSTEMS FOR FACILITATING DATA COMMUNICATION

CROSS-REFERENCE TO RELATED APPLICATION

This application is a continuation of U.S. patent application Ser. No. 13/481,791, filed May 26, 2012, the contents of which are incorporated by reference in their entirety as if recited in full herein.

BACKGROUND OF THE INVENTION

Field of Invention

The invention disclosed herein generally relates to methods and systems for initiating data communication. More specifically, the invention disclosed herein relates to methods and systems for communicating data to and with target remote mobile computing devices.

Description of Related Art

Mobile computing devices (MCDs) are becoming ubiquitous. From cell phones to personal digital assistants (PDAs) to tablet and laptop computers, to wearable and embedded MCDs, people fortunate enough to live in developed countries tend to have one or more MCD each. Many MCDs have multiple ways to communicate data, from radio transmissions, such as cellular, including LTE and LTE Advanced, more local networks such as Wi-Fi, Super Wi-Fi, WiMAX, and WiMAX2, and direct communication technologies such as Bluetooth, Near Field Communication (NFC), infrared, and other technologies.

In order to communicate data with an MCD, a requesting device, i.e. one that sends a request to communicate data, generally must know something about the target MCD. For example, a phone number is generally required to either call or sent a text, SMS, or MMS message. If the devices have a social relationship, for example their owners are friends, connections, share a circle, or have another such relationships on one or more social networks, and they allow each other to see their locations, the devices may be able to communicate data using that social relationship.

However, many MCDs, particularly MCDs that operate on various networks, transmit data via the network that allows the network to track their location over time. Such activities can create a large amount of location-based data, data that is generally searchable by, among other things, location.

BRIEF SUMMARY OF EMBODIMENTS OF THE INVENTION

In accordance with one or more embodiments of the invention, methods and systems for facilitating data communication are disclosed. Certain of the methods include the steps of: receiving a request to communicate data with a target remote mobile computing device, the request to communicate data comprising data indicative of a location of a target remote mobile computing device and data indicative of a time of the request; determining a location to be searched for potential target remote mobile computing devices based at least in part on the data indicative of a location of a target remote mobile computing device; accessing stored location-based data of mobile computing devices proximate the determined location to be searched for potential target remote mobile computing devices around a time of the request; identifying one or more potential target remote mobile computing devices proximate the determined location to be searched for potential target remote mobile computing devices around a time of the request based at least in part on the accessed stored location-based data of mobile computing devices proximate the determined location; and sending data, consistent with the request to communicate data, to at least one of the one or more potential target remote mobile computing devices. Further embodiments include: where the request is initiated from a first remote mobile computing device; where accessing stored location-based data of mobile computing devices proximate the determined location to be searched for potential target remote mobile computing devices and the identifying one or more potential target remote mobile computing devices proximate the determined location to be searched for potential target remote mobile computing devices are performed independent of any social relationship data; and where determining a location to be searched for potential target remote mobile computing devices is based solely on one or more of the data indicative of a location of the target remote mobile computing device and any data indicative of a location of a device from which the request to communicate data is initiated, along with any calculations based thereupon.

Other of the embodiments include: where identifying one or more potential target remote mobile computing devices proximate the determined location to be searched for potential target remote mobile computing devices is based solely on the accessed stored location-based data of mobile computing devices proximate the determined location, along with any calculations based thereupon; accessing differentiating data, distinct from the location-based data of mobile computing devices proximate the determined location to be searched for potential target remote mobile computing devices, helping to differentiate the target remote mobile computing device from one or more other potential target remote mobile computing devices proximate the target remote mobile computing device; where identifying one or more potential target remote mobile computing devices is further based at least in part on the differentiating data; where the request to communicate further comprises differentiating data, the differentiating data helping to differentiate the target remote mobile computing device from any proximate non-targeted remote mobile computing devices, and wherein identifying one or more potential target remote mobile computing devices proximate the determined location to be searched for potential target remote mobile computing devices is further based at least in part on at least some of the differentiating data; where sending data representative of the request to communicate to at least one of the one or more potential target remote mobile computing devices comprises sending data representative of the request to communicate to at least two of the potential target remote mobile computing devices; receiving data responsive to at least one of the requests to communicate data from the target remote mobile computing device and transmitting at least some of the received data responsive to at least one of the requests to communicate data to a device from which the request to communicate data was initiated; and where the request to communicate data further comprises data indicative of a location of the device from which the request is initiated.

Certain of the methods include: where the request to communicate data comprises a request to communicate data with at least one additional target remote mobile computing device, and further comprising determining a location to be searched for at least one of the at least one additional target remote mobile computing devices, accessing location-based data of mobile computing devices proximate each of the determined location to be searched, identifying at least one potential target remote mobile computing device proximate each of the determined location to be searched, and sending data representative of the request to communicate data to at least one of the at least one additional target remote mobile computing devices; sending a request for differentiating data to the device from which the request to communicate data was initiated, the differentiating data being helpful to differentiate the target remote mobile computing device from one or more other potential target remote computing devices proximate the target remote mobile computing device, wherein the sent request for differentiating data comprises alternative differentiating data related to more than one of the potential target remote mobile computing devices proximate the determined location to be searched for the target remote mobile computing device, from which a recipient of the sent request for differentiating data is to select to help differentiate the target remote mobile computing device from other potential target remote mobile computing devices; receiving differentiating data, distinct from the data indicative of a location to be searched for potential target remote mobile computing devices, from a device from which the request to communicate data was initiated, the differentiating data comprising information to differentiate the target remote mobile computing device from one or more of the one or more potential target remote mobile computing devices, and further comprising using the received differentiating data at least in part to differentiate the target remote mobile computing device from one or more of the one or more potential target remote mobile computing devices; receiving data responsive to the request to communicate data from the target remote mobile computing device; initiating further data communication between the target remote mobile computing device and the device from which the request to communicate data was initiated; where the request to communicate data further comprises data about the device from which the request to communicate data was initiated, distinct from any of the data indicative of a location of the device from which the request is initiated, helpful for the target remote mobile computing device to determine appropriate responsive behavior; where wherein sending data to at least one of the one or more potential target remote mobile computing devices comprises sending data to the target remote mobile computing device; and accessing stored criteria data indicative of predetermined criteria related to accepting or rejecting requests to communicate data, and further comprising using at least some of the accessed stored criteria data, at least in part, to determine how to respond to a received request to communicate data.

Certain of the systems include: a data receiver for receiving requests to communicate data with a target remote mobile computing devices, the requests to communicate data comprising data indicative of locations of target remote mobile computing devices and respective data indicative of times of the requests; control logic for determining locations to be searched for potential target remote mobile computing devices based at least in part on the data indicative of locations of the target remote mobile computing devices; a database of stored location-based data of mobile computing devices that includes data indicative of mobile computing devices proximate at least some of the determined locations to be searched for potential target remote mobile computing devices; control logic for identifying one or more potential target remote mobile computing devices proximate one or more respective determined locations to be searched for potential target remote mobile computing devices around times of respective requests based at least in part on respective data indicative of mobile computing devices proximate the determined locations to be searched for potential target remote mobile computing devices; and a data transmitter for transmitting data consistent with the requests to communicate data to one or more potential target remote mobile computing devices.

Other of the methods may include: receiving a first request from a first remote mobile computing device to communicate data with a first target remote mobile computing device, the first request comprising data indicative of a location of the first remote mobile computing device, data indicative of a location of the first target remote mobile computing device, and data indicative of a time of the first request; storing first request data indicative of the first request, the first request data comprising data indicative of a location of the first remote mobile computing device, data indicative of a location of the first target remote mobile computing device, and data indicative of a time of the first request; determining a location to be searched for first potential target remote mobile computing devices based at least in part on the data indicative of a location of the first target remote mobile computing device; receiving a second request from a second remote mobile computing device to communicate data with a second target remote mobile computing device, the second request comprising data indicative of a location of the second remote mobile computing device, data indicative of a location of the second target remote mobile computing device, and data indicative of a time of the second request; storing second request data indicative of the second request, the second request data comprising data indicative of a location of the second remote mobile computing device, data indicative of a location of the second target remote mobile computing device, and data indicative of a time of the second request; determining a location to be searched for second potential target remote mobile computing devices based at least in part on the data indicative of a location of the second target remote mobile computing device; accessing stored location-based data of mobile computing devices proximate the determined location to be searched for first potential target remote mobile computing devices around a time of the first request; identifying one or more potential first target remote mobile computing devices proximate the determined location to be searched for first potential target remote mobile computing devices around a time of the first request, from the accessed stored location-based data of mobile computing devices proximate the location to be searched for first potential target remote mobile computing devices around a time of the first request; accessing stored location-based data of mobile computing devices proximate the determined location to be searched for second potential target remote mobile computing devices around a time of the second request; identifying one or more potential second target remote mobile computing devices proximate the location to be searched for second potential target remote mobile computing devices around a time of the second request from the accessed stored location-based data of mobile computing devices proximate the location to be searched for second potential target remote mobile computing devices around a time of the second request; matching at least two of the requests to communicate data, for which indicative data have been stored, where the one or more potential second target remote mobile computing devices includes the first remote mobile computing device, and where the one or more potential first target remote mobile computing devices includes the second remote mobile computing device; and communicating data consistent with at least one of: the first request to the second remote mobile computing device and the second request to the first remote mobile computing device.

Other of the systems may include: a data receiver for receiving requests from remote mobile computing devices to communicate data with target remote mobile computing devices, the requests to communicate data comprising data indicative of locations of requesting remote mobile computing devices, data indicative of locations of target remote mobile computing devices, and data indicative of times of the requests; one or more databases for storing received request data, the received request data comprising the data indicative of locations of requesting remote mobile computing devices, the data indicative of locations of target remote mobile computing devices, and the data indicative of times of the requests; control logic for determining locations to be searched for potential target remote mobile computing devices based at least in part on one or more of the data indicative of locations of requesting remote mobile computing devices, the data indicative of locations of target remote mobile computing devices, and the data indicative of times of the requests; one or more databases of stored location-based data of mobile computing devices, including data indicative of mobile computing devices proximate at least some of the determined locations to be searched for potential target remote mobile computing devices; control logic for identifying one or more potential target remote mobile computing devices proximate at least some of the determined locations to be searched for potential target remote mobile computing devices around a time of respective requests, based at least in part on the data indicative of mobile computing devices proximate the determined locations to be searched for potential target remote mobile computing devices; and a data transmitter for transmitting data consistent with the requests to communicate data to one or more potential target remote mobile computing devices.

Yet other of the methods may include: where the first remote mobile computing device and the second remote mobile computing device operate on different communications networks; where the first remote mobile computing device and the second remote mobile computing device operate on the same communications network; where at least one of the received requests to communicate data further comprises an indication of an orientation of the associated mobile computing device; where the request to communicate data from the first remote mobile computing device includes an indication of a target distance from the first remote mobile computing device to the second remote mobile computing device; where at least one received request to communicate further includes an indication of an acceleration of the associated mobile computing device; where the first mobile computing device and the second mobile computing device are associated with vehicles; where the further data communication between the target remote mobile computing device and the device from which the request to communicate data was initiated is direct communication; and where further comprising estimating a trajectory of locations to be occupied by the target remote mobile computing device based at least in part on the data indicative of a location of the target remote mobile computing device.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF THE PREFERRED EMBODIMENTS

Figure 1:
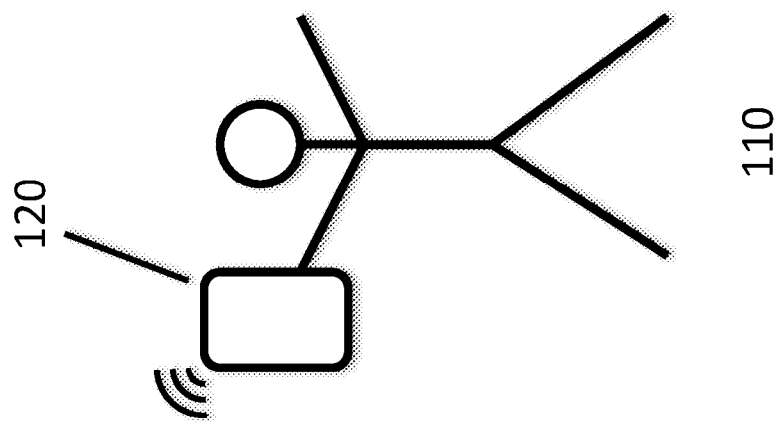
FIG. 1 illustrates two users and their respective MCDs.
Figure 1:
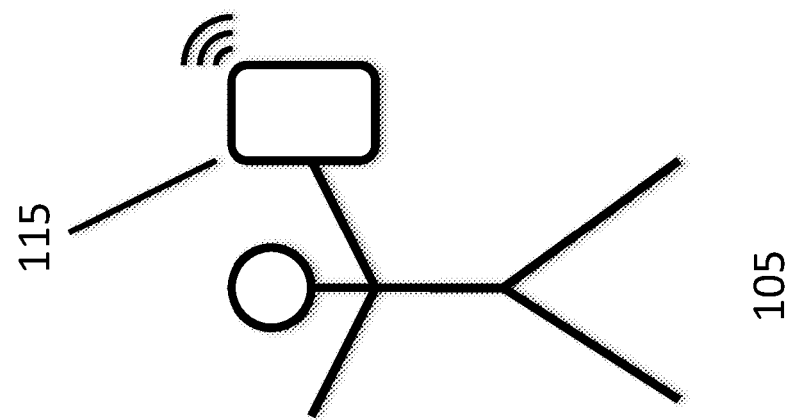

FIG. 1 illustrates two users and their respective MCDs. User 105 is illustrated with mobile computing device (MCD) 115. User 110 is illustrated with MCD 120. MCD 120 is remote from MCD 115, and can be referred to as remote mobile computing device 120 or RMCD 120. User 105 would like to communicate data, via MCD 115 and RMCD 120, with user 110. As illustrated, MCDs 115 and 120 share no known social connections, and they do not make physical contact with each other. In other words, MCDs 115 and 120, relative to each other, are unknown remote mobile computing devices.

Figure 2:
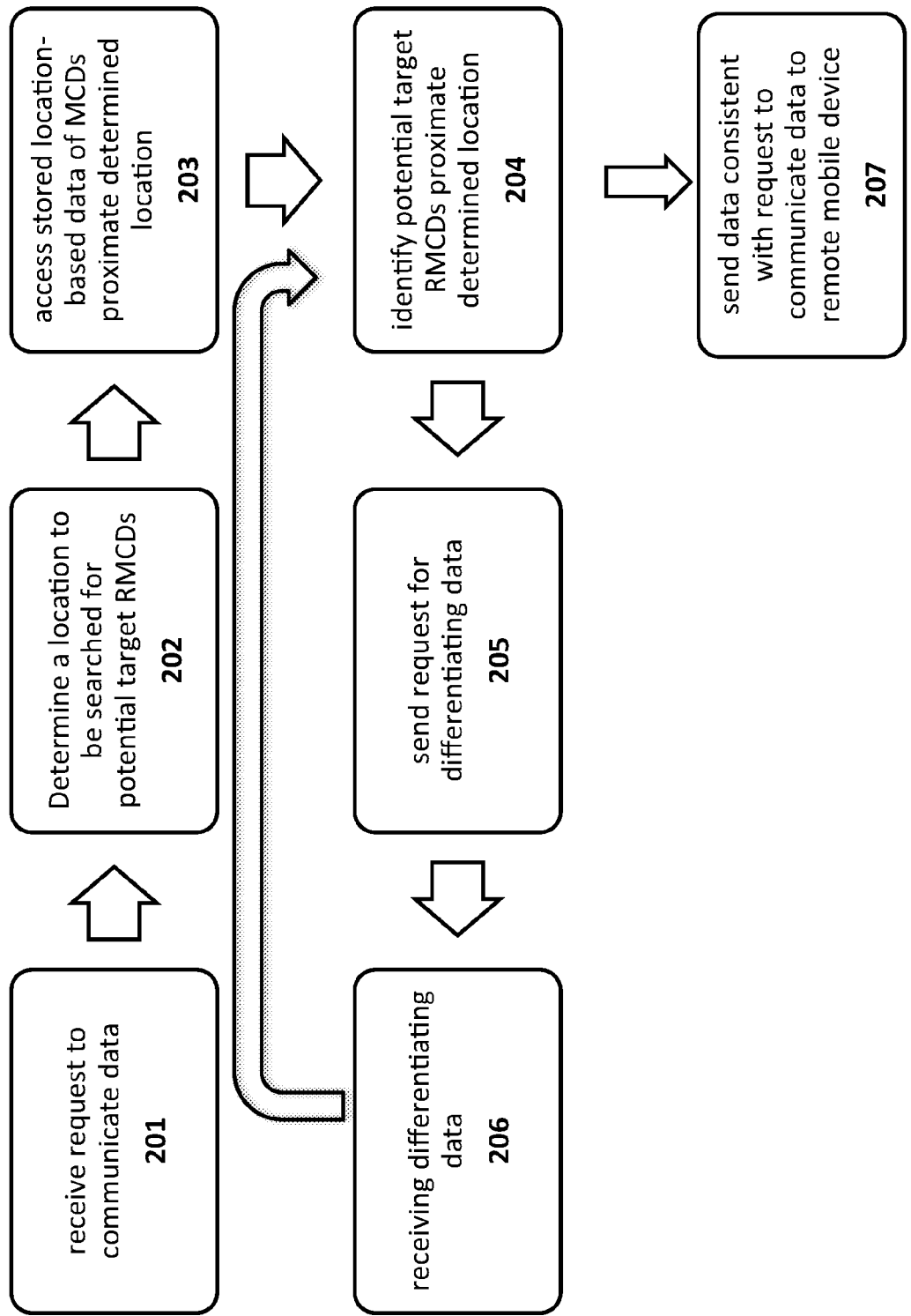
FIG. 2 illustrates a flowchart perspective of an embodiment of methods and systems for communicating data.

FIG. 2 illustrates a flowchart perspective of an embodiment of methods and systems for communicating data. Beginning with step 201, a request is received to communicate data with one or more target RMCDs. The request includes data indicative of a location of a target RMCD, as well as data indicative of a time of the request. The request may also include data indicative of a location of the requesting MCD, particularly if the requesting device is a mobile device. The request may also include other data, such as differentiating data, helpful to differentiate a target RMCD from one or more other potential target RMCDs proximate a target RMCD. The request may also include other data, such as data about the device from which the request to communicate data was initiated, distinct from any data indicative of a location of the device from which the request is initiated, helpful for a target RMCD to determine appropriate responsive behavior. Requests to communicate data with a target RMCD can be received from other MCDs. Requests to communicate data with a target RMCD can also be received from non-mobile computing devices, for example, from a desktop computer, a security console, a server, and many other types of computing devices.

At step 202, the systems or methods determine a location to be searched for potential target RMCDs, based at least in part on data indicative of a location of a target RMCD, and sometimes also based at least in part on data indicative of a location of a requesting device, including any calculations based upon those data.

At step 203, stored location-based data of mobile computing devices proximate a determined location is accessed. The accessed stored location-based data of mobile computing devices is usually dependent upon a time of the request, so that the accessed data is relevant to determining the MCDs that were or will be proximate a determined location at a relevant time.

At step 204, potential target RMCDs proximate a determined location are identified, based at least in part on the accessed stored location-based data of MCDs proximate a determined location around a time of a request to communicate data.

At optional step 205, a request for differentiating data is sent to the device from which the request to communicate data was initiated. The differentiating data is information to help differentiate a target RMCD from one or more potential target RMCDs that are in fact, but not yet known to the system or methods, non-targeted RMCDs. Differentiating data may also be sent as part of a request to communicate data. At optional step 206, differentiating data, responsive to a request for differentiating data, is received. With differentiating data, step 204 may be repeated or refined, and a list or number of potential target RMCDs may be reduced, preferably until there is only one potential target RMCD, the potential target RMCD being the target RMCD. Without regard to whether differentiating data is sent as part of a request to communicate data, whether it is sent in response to a specific request for differentiating data, or some combination thereof, or received in another process, the differentiating data is generally used to help the systems and methods differentiate an actual target RMCD from other, non-targeted, potential target RMCDs.

At step 207, data consistent with a request to communicate data is sent to an RMCD. Preferably, the data consistent with a request to communicate data is sent to the target RMCD. Data consistent with a request to communicate data can be a request to communicate data. Data consistent with a request to communicate data can be a message that a requestor wants to communicate with a target, and can be in a variety of formats, including text, SMS, MMS, a picture or video, 3D or holographic images, a phone call, and many other types of data.

Figure 3:
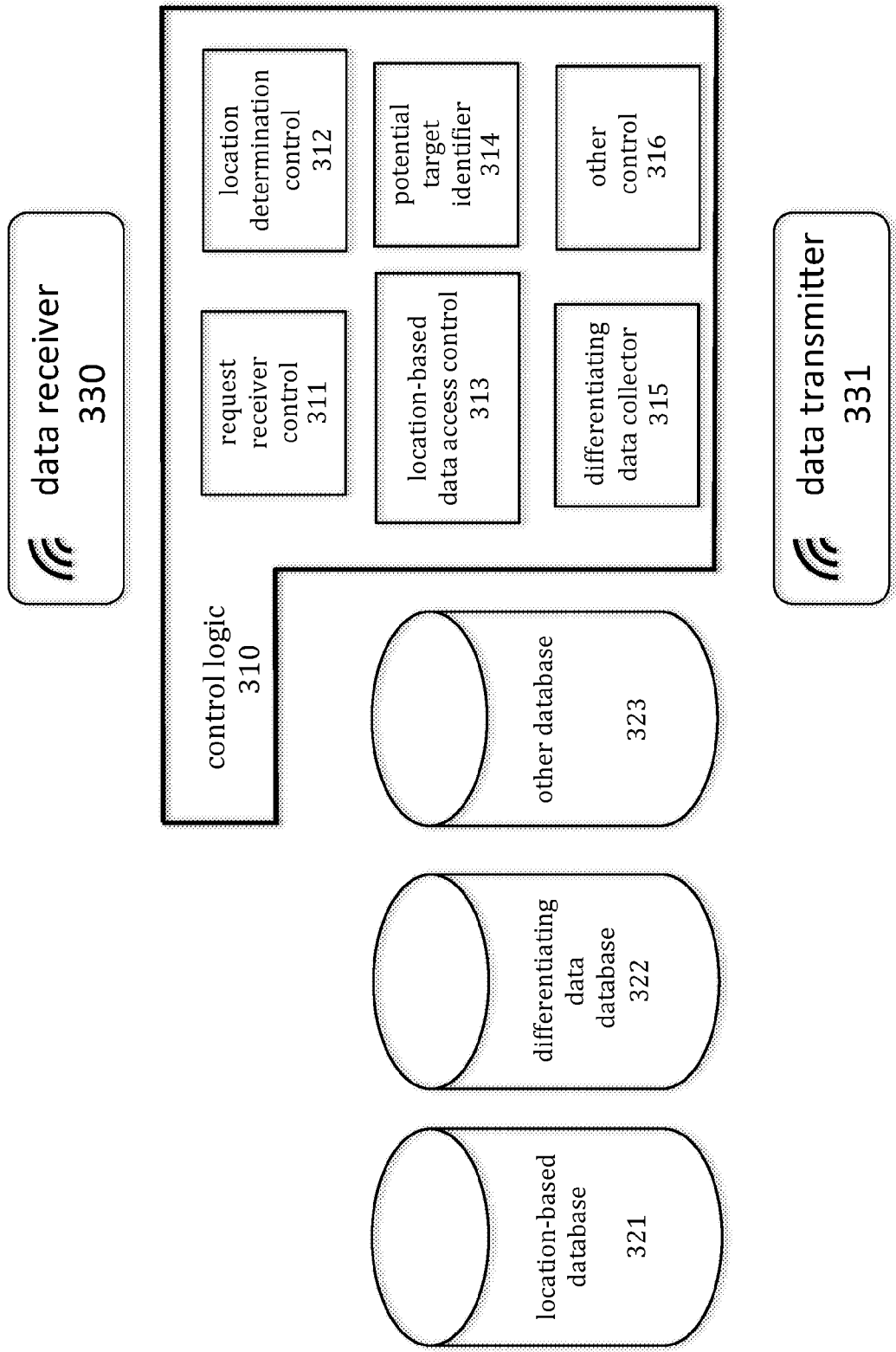
FIG. 3 illustrates a system perspective of an embodiment of methods and systems for communicating data.

FIG. 3 illustrates a system perspective of an embodiment of methods and systems for communicating data. Systems and methods include control logic 310 that controls various operations. Control logic 310 may be hardwired logic, or it may be software or firmware for execution by a processor, not illustrated, or other conventional means. Control logic 310 may include request receiver control 311 for controlling received requests to communicate data, location determination control 312 for determining a location to be searched for potential target RMCDs, location-based data access control 313 for accessing location-based data, potential target identifier control 314 for identifying potential target RMCDs, differentiating data collector 315 for collecting differentiating data, and other control 316 for performing other functions, such as analyzing collected differentiating data, processing data helpful for a target RMCD to determine appropriate responsive behavior, and other functions.

FIG. 3 also illustrates data receiver 330 and data transmitter 331 for receiving and transmitting, respectively, data from and to devices, including remote mobile computing devices. Data receiver 330 and data transmitter 331 may be the same element, which would then be data transceiver 330/331, not illustrated. Data receiver 330 and data transmitter 331 can receive and transmit data in a variety of formats and using a variety of methods, and may be wired and/or wireless.

FIG. 3 also illustrates several databases. Location-based database 321 stores location-based data of MCDs, and is accessed to determine potential target RMCDs proximate a determined location around a time of a request. Location-based database 321, like each of the databases, can be a single database or can be made of several, even many, and even very many, databases, potentially with different information in different formats in each. Differentiating data database 322 is a store of data that can help differentiate target RMCDs from non-targeted potential RMCDs. Differentiating data database 322 could be part of location-based database 321. Other database 323 is illustrative of any other data stores that may be accessed by the systems or methods, and can include such data as any social relationship data, stored criteria data indicative of predetermined criteria related to accepting or rejecting requests to communicate data, data related to attributes of MCDs or their users, and many other types of data that could be accessed by the system and methods.

Proximate

Proximate is preferably context specific. That is, an analysis of location-based data of mobile computing devices proximate a determined location to be searched for potential RMCDs may well differ based on different contextual situations. For example, the location around which might be considered proximate is likely to vary depending on situation. By way of simple example, what is proximate could be based at least in part on the mobile computing device density in or near an estimated location, under which in a crowded environment, a physical radius of approximately 2 meters might be appropriate, or possibly 50 centimeters, while in an uncrowded environment, a physical radius of approximately ten meters might be more appropriate. Of course, proximities of less than a 50 centimeter radius, even significantly less, or more than approximately ten meters, even significantly more, might be appropriate based on context. Mobile computing device density, of course, can be determined in many ways, for example by counting or estimating a number of mobile computing devices in or near a particular location.

Other factors on which a determination of what is proximate might rest are velocity, acceleration, jerk, trajectory, and other data for a remote mobile computing device that is a target of the request to communicate, and/or of a requesting MCD. For example, if the remote mobile target device is estimated or known to be moving at a high velocity, a larger proximate area might be appropriate as compared to a situation in which a remote mobile target device has no significant net velocity, for example because it is a mobile phone being held by a user who is sitting at a coffee shop.

Remote

Remote generally indicates that there is some distance, often varying, between devices. This contrasts with devices that may touch, or bump, each other. Devices that touch, or bump, other devices have an opportunity to create a bumping event that has shared physical characteristics, such as acceleration or jerk, that allow the touching, or bumping, devices to identify each other, or to share a common touching or bumping event that can be used to identify devices attempting to communicate. Remote devices generally share no such event. In addition, the way that remote devices target, identify, and communicate with each other have nothing to do with any shared physical touching or bumping activity. This is exemplified when MCDs are associated with vehicles, a situation in which it would be impractical, detrimental, and dangerous, for the vehicles to have to touch each other in order to communicate.

Identifying Target RMCDs

Several classes of remote mobile computing devices (MCDs) are contemplated, including one or more target remote mobile computing devices (RMCDs), one or more potential target mobile computing devices, and one or more non-targeted remote mobile computing devices. A target mobile computing device is a mobile computing device that is a target of one or more requests to communicate data. A potential target mobile computing device is a remote mobile computing device, usually proximate a determined location to be searched for such a target mobile computing device, that may include target mobile computing devices. Potential target remote mobile computing devices may include remote mobile computing devices from which one or more target remote mobile computing device may be identified or selected or discerned. Non-targeted remote mobile computing devices are mobile computing devices other than targeted remote mobile computing devices. Often, when the systems and methods are attempting to discern which one or more of several potential target remote mobile computing devices are target remote mobile computing devices, certain of the potential target remote mobile computing devices will be determined to not be target remote mobile computing devices. Such devices are considered to be non-targeted remote mobile computing devices.

Identifying a target remote mobile computing device from one or more potential target remote mobile computing devices may be done in the same step as identifying one or more potential target mobile computing devices proximate a determined location to be searched for potential target remote mobile computing devices. For example, if a location of a potential remote mobile computing device is received, and a location to be occupied by a remote mobile computing device is estimated, and location-based data of mobile computing devices proximate the estimated location to be occupied by the remote mobile computing device is accessed, and that location-based data indicates that there is only one mobile computing device proximate the estimated location to be occupied, then at the same time, and in the same way, the system will both identify one or more (in this example, one) potential target mobile computing device, that one potential target mobile computing device will likely be the remote mobile computing device that was requested to communicate data with, and the two steps of identifying one or more potential target mobile computing devices and identifying the remote mobile computing device from one or more potential target mobile computing devices will be done together, as identifying one or more potential target mobile computing devices, when only one such potential target mobile computing device is identified, will tend to also be identifying the remote mobile computing device.

Location-based data can be any type of data that can help to identify a location of an MCD. Such data can be in many different formats. For example, location-based data can be in any of the following, or other, forms: GPS coordinates; latitude and longitude data, possibly with altitude information combined; cell-based data identifying a cellular or other type of mobile communications tower, receiver, or transceiver, near which data helping to determine a location of a mobile computing device may be available; data related to other types of networks, such as Wi-Fi, Wi-Max, or other types of wired or wireless networks that can be helpful for determining a location of a mobile computing device on such a network; and internet protocol addresses, which can sometimes be used to determine location information. Location-based data can also be social network data that can be used to determine mobile computing devices near an estimated location, for example so-called check-ins at certain known locations, social network posts, comments, or other digital communications that can include indications of locations of the mobile computing devices from which such communications are made, or other types of social network based location information of mobile computing devices.

In some instances, identifying one or more potential target remote mobile computing devices proximate a determined location to be searched for potential target remote mobile computing devices is based solely on accessed stored location-based data of mobile computing devices proximate a determined location, along with any calculations based thereupon. In such instances, potential target remote mobile computing devices are identified based solely on stored location-based data of mobile computing devices that are indicated as having been in or near the location to be searched, around a relevant time of a request. Such potential target remote mobile computing devices are not identified, for example, by any particular social relationship data that connects any potential target remote mobile computing devices, or their users, with a device from which a request to communicate data is initiated, or its user. Rather, potential target remote mobile computing devices are based on stored location-based data of mobile computing devices proximate a determined location, generally without regard to any social or other relationship data that may connect any potential target remote mobile computing devices with any device from which a request to communicate data is initiated.

Differentiating Data

In certain aspects, multiple potential target mobile computing devices may be proximate an estimated location to be occupied by the remote mobile computing device sought with which to communicate data. In some such circumstances, aspects may send a request for differentiating data to the device from which a request to communicate data was initiated. The system can have varying degrees of intelligence or complexity. In a simple example, the system may indicate to the mobile computing device from which the request to communicate data was initiated that more than one potential target mobile computing device has been determined to be proximate an estimated location to be occupied, and that a user of the mobile computing device from which the request to communicate data was initiated should provide additional information to help distinguish between or among the potential target mobile computing devices. A slightly more complex system might inform the requestor that a certain number, for example two or three, or more, potential target mobile computing devices are proximate an estimated location.

A significantly more complicated system is envisioned as well. For example, in some aspects, a request for differentiating data may comprise alternative differentiating data related to more than one of the potential target mobile computing devices proximate an estimated location to be occupied by a remote mobile computing device, and a recipient of the sent request for differentiating data is offered alternative differentiating data to select to aid in reducing a number of potential target mobile computing devices. For example, a request to communicate data with a second remote mobile computing device is sent from a first remote mobile computing device. The system or methods estimate a location to be occupied by the second remote mobile computing device. The system or methods then access stored location-based data of mobile computing devices proximate the estimated location to be occupied by the second remote mobile computing device. Based at least in part on the accessed stored location-based data, the system or methods identify one or more potential target mobile computing devices proximate that location to be occupied by the second remote mobile computing device. The system may access, in this example, location-based data for four different mobile computing devices proximate the estimated location. The system may further access alternative differentiating data related to more than one of those four different mobile computing devices. This alternative differentiating data can be any type of data that helps to distinguish, in the alternative, between or among more than one potential target mobile computing device. This alternative differentiating data can, for example, be indicative of: identifying information on what kind of mobile computing device, for example a mobile phone verses a tablet verses a laptop computer; a specific brand of device, for example an Apple iPhone verses an Apple iPad verses a Samsung Galaxy phone; information pertaining to respective owners of the mobile computing devices, for example a female owner versus a male owner, a twenty-four year old female owner verses a thirty-two year old female owner; social network data of owners of the mobile computing devices, for example Brad, a forty-eight year old second degree connection on a particular social network to the requestor to communicate data, who is from Shawnee, Okla., versus Angelina, a thirty-six year old from Los Angeles, Calif. first degree connection on a different social network to the requestor to communicate data; different types of vehicles with which some of the potential target mobile computing devices are associated, for example a black 2012 Ford F-150 4-door Super Crew cab registered in Nevada versus a charcoal gray 2010 Chevrolet Avalanche Z71. Such a more complicated system may well take advantage of an answer-engine or similar type of service that has access to structured data from a variety of sources, such as Wolfram Alpha. The system could use such an answer-engine in conjunction with a computerized personal assistant such as Apple's Siri. Of course, a request for differentiating data can be delivered in many formats, for example by text, by image, still or moving, and by voice. So, in response to a request to communicate data, the system or methods could respond to the requestor by voice data, potentially conversationally, with a response such as 'In response to your request, I see three people in the area you targeted. The first is a thirty-seven year old man who purchased items at the nearby Starbucks Coffee twelve minutes ago, the second is a forty-two year old woman with an iPhone, and the third is a minor with an iPod touch connected to the Starbucks Wi-Fi network; would you like to communicate data with one of these people?' The person associated with the mobile computing device requesting to communicate data can then select one of the mobile computing devices for which alternative differentiating data was sent, or can respond that no, none of those potential target mobile computing devices seems correct, or some other response, for example, no, the person (i.e. associated with a mobile computing device) I want to connect to is about fifteen feet away from those three people you asked me about, towards Main Street. The system and methods can then recalculate the determined location to be searched, re-access stored location-based data of mobile computing devices proximate that location, and re-identify potential target mobile computing devices proximate that newly estimated area, and potentially utilize differentiating data for the re-identified potential target mobile computing devices.

Differentiating data can be collected by the systems and methods in several different ways. One way is that differentiating data is sent with an initial request to communicate data. For example, a spoken request to communicate data could be similar to 'Please connect me with the boy who looks like he's in his early thirties, walking half a block ahead of me on the same side of the street, at roughly the same pace; he's carrying a bag from Peet's Coffee, and may have purchased something from them recently.' It is to be noted that there are many potential sources of data that can help to distinguish a sought out mobile computing device. A purchase at Peet's Coffee, for example, could be known by: a mobile phone company that tracks either location of their devices or transactions, for example via near field communication, NFC; a network operator that similar stores data related to location and/or purchases; a social network, potential on which a targeted user shares data, for example a check-in at Peet's in which the user indicates 'just picked up one pound of Ethiopian special brew'; data from a business, such as Peet's itself, storing transaction data for paying for a purchase with a mobile computing device; and many other potential sources of such data. Alternatively, and as described above, differentiating data can be requested of the initial requestor to communicate data, potentially in response to insufficient data in the initial request to successfully determine, based on data to which the system or methods have access, the particular remote mobile computing device with which to communicate data. Differentiating data can also be requested of the device that sent the initial request to communicate data, by the systems or methods, for example in response to a condition in which the systems and methods have insufficient information to sufficiently narrow down the potential target RMCDs.

Communicate Data

Several types of data communication are envisioned between a device from which a request to communicate data is initiated and a remote mobile computing device. Such data communication can be networked, for example: an AT&T mobile subscriber communicates with a Verizon Wireless subscriber; one China Mobile wireless subscriber communications via China Mobile's network with another China Mobile wireless subscriber; two users of a Wi-Fi or other wireless network can connect through that wireless network; a cellular network user might communicate data with a Wi-Fi network user; or two users on a corporate network can communicate via that network. Initial data communication, and requests therefore, are generally contemplated to be done indirectly, that is, through one or more networks. However, in some aspects, after initial data is communicated between an RMCD and another device, additional communications may be enabled, for example data can be communicated via direct communication between the devices, such as Bluetooth, NFC, infrared, and other direct data transfer options.

The data that is requested to be communicated can be many different types of data, including voice communications, text, MMS or SMS communications, multimedia communications, polling communications, survey communications, and many other types of data communication.

Unknown

In some aspects, the remote mobile computing device is unknown to the device from which the request to communicate data is initiated. Unknown in this context means that there is no known and utilized relationship between the devices at the time that data is communicated. For example, there is no known social network relationship, such as friends, friends of friends, connections, etc., between the devices, or between the people associated with the devices. While the people associated with the devices could in fact be friends, if no social network relationship data is used in any of the processes related to initiating data communication, it would be said that the remote mobile computing device is unknown to the device from which a request to communicate data is initiated.

Accessing Location-Based Data

Location-based data of mobile computing devices is generally stored in one or more databases, which can be maintained by any number of parties, potentially including: device manufacturers; network operators, including large scale network operators such as Verizon Wireless with their CDMA, LTE, or future-generation network, AT&T Mobility with their GMS, LTE, or future-generation network, and China Mobile with their GSM, TD-SCDMA, LTE, or future-generation network, small scale network operators such as providers of Wi-Fi networks, and medium scale network operators such as those that operate WiMAX or mesh networks; social networks; owners of data transmission technologies, such as mobile network towers; merchants; application developers; internet-based entities; and other third parties. Location-based data includes data that can be searched based on location, and generally also based on time. Location-based data can also be used to determine a location of a mobile computing device at some point in time.

Location-Based Data

Cellular telephones use radio to communicate between a user's handset and the network, utilizing a network of radio base stations, sometimes called cell sites. A base station makes connections between the telephone network and nearby mobile phones, including when a call is made or received. Mobile phones regularly identify themselves to base stations near them, particularly to the one with the strongest radio signal. When a mobile phone moves from near one base station to near another during data transfer, there is a handoff between the base stations. In such networks, there are several ways to calculate the location of a mobile computing device. In some cases, the mobile computing device calculates its location internally, often using a GPS satellite receiver chip that is build into the mobile computing device to determine, based on relationships to some of the constellation of satellites, latitude and longitude. In some cases, location is calculated externally, by the mobile network using cellular or other radio interfaces, sometimes with assistance from the mobile computing device. Triangulation, trilateralization, and other techniques may be used to determine location of an MCD. Many network-based technologies exist to monitor and record location of mobile computing devices operating on the network, for example the identity of a base station with which a mobile computing device is communicating, including small scale base stations such as microcells, picocells, femtocells, and the like, some of which serve very small areas compared to a larger scale base station, potentially particular floors of buildings, individual homes or offices, or rooms therein. Location can be more precisely estimated by calculating and using the time of arrival and angle of arrival of a wireless signal from a mobile computing device at multiple base stations; such technology can currently match some GPS resolution and generally improves over time.

Location can also be estimated on devices that run on many types of networks other than cellular networks. Mobile computing devices operating on a Wi-Fi network, for example, can be similarly located within the Wi-Fi network. One exemplary way is to use the Wi-Fi network signal strength and other data, potentially with a known map of Wi-Fi network strength as a function of location, to determine a location of a mobile computing device operating on the network. Other networks also access or collect data that can be used to determine a location of a device operating, including just being in an on rather than an off state (i.e., powered on, though not necessarily actively transmitting data), on the network, and can be a source of location-based data of mobile computing devices.

Data Indicative of a Location

Certain aspects rely on data indicative of a location of an MCD. Several types of data indicative of a location of an MCD are contemplated, including data indicative of a location of an MCD sending a request to communicate data and data indicative of a location of a target MCD. Data indicative of a location of an MCD sending a request to communicate data can often be taken from the MCD itself. A functioning GPS chip allows an MCD to ascertain its location and to access data indicative of its location and send some portion of it as part of a request. Data indicative of a location of an MCD can also be retrieved from a network operator or other source. For example, cellular or other radio networks, or similar networks, often store data indicative of locations of MCDs operating on their networks. Over time, this data tends to get more accurate and more helpful in using it for location-based purposes. This data can be accessed to be used as data indicative of a location of a requesting MCD, for example. Other types of networks, for example Wi-Fi networks, may also store periodic location-based information about MCDs operating thereon, and this data can be used as or form the basis of data indicative of a location of an MCD.

Data indicative of a location of a target RMCD tends to be different from data indicative of a location of a requesting device, mostly because specific information about a target, or potential target, RMCD is often not available to the system or methods, or additional information is required in order to ascertain such location-based information for such targets. Data indicative of a location of a target RMCD tends to come from, generally wholly, sometimes mostly, and possibly in small part, a requesting device. A requesting device can use a variety of tools to determine data indicative of a location of a target RMCD. In addition, there are many different forms that data indicative of a location of a target RMCD can take, and many different ways in which such data can be included in a request to communicate data. Data indicative of a location allows the system or methods to determine, often based on a location of the requesting device, a location to be occupied by a target RMCD. The data indicative of a location can be one part of the data necessary to estimate a location to be occupied by a target RMCD, or it can be sufficient on its own, or with a known location of the requesting device, to estimate a location to be occupied by a remote mobile computing device.

One simple way to determine data indicative of a location of a target MCD is to have information about a location of a requesting device, and calculate an estimated location of a target RMCD from data on a location of a target RMCD relative to a known location of a requesting device. Examples of ways to calculate, estimate, or determine relative locations to a known or knowable location include: inputting a distance, possibly estimated, from a device; inputting a distance and a direction or orientation; using a distance and/or direction/orientation tool, possibly imbedded in a requesting device, that calculates a location, for example a laser or similar that can be pointed towards or at a target RMCD and can calculate a relative distance; viewing a visual indication of a scene in which a target RMCD is located, selecting, possibly by touch-control on the screen, possibly by voice, text-input, selection, or other commands, a target RMCD of choice, and relying upon the requesting device to determine data indicative of the location, possibly relative to the requesting device's location; an audio interface in which a user simply tells a device where it wants the device to look, in a way that is understandable by the device or by another device, possibly on the same network; and many other ways. For example, a user could aim a camera of an MCD at a target area, and touch the area of the screen that shows the target RMCD, similar to mechanisms, such as in Apple's iPhone, that allow users to touch an area of the screen that they want to be in focus for image capture. Similarly, a user could touch an area of the screen in which a target RMCD is displayed, and the user's device could determine data indicative of a location of the target RMCD. Using this method, a user's device could also collect differentiating data to help differentiate a targeted RMCD from non-targeted potential RMCDs. If a camera on a user's device records that a target user is using a particular brand of RMCD, such as an iPhone, that information could be used to differentiate the RMCD from proximate non-iPhone devices, and therefore help to identify a target RMCD. A gathered image, including video, 3D, holographic, still, etc., could be used to collect other types of differentiating data, including characteristics about a user, such as gender, age range, etc., characteristics about an RMCD, such as make or model, and other data that could be used to help identify a target RMCD. A user's MCD could also be pointed at a target RMCD, potential with a laser/pointer mechanism that can determine distance, and therefore location based in part on a location of the user's device.

Received Request

Aspects disclosed herein include receiving a request to communicate data. Such requests can be received either remotely or internally. That is, a processor and control logic for receiving such requests can be remote from the device from which the request to communicate data is initiated. The processor and control logic for receiving such requests can also be integral with a device from which the request to communicate data is initiated. For example, appropriate control logic within a mobile computing device, such as a mobile smartphone or mobile general purpose computer, devices which may be converging, may be received from another portion of that mobile computing device. This may even be the case if the control logic, or the processor, receiving such request to communicate data, is the same as control logic, or the processor, that is used to initiate such a request. That is to say that it is contemplated that a portion of control logic, or an object of logic, or a portion of a general purpose processor, or a specific purpose processor, or function, data structure, or instance of a class, or an ephemeral compilation of attributes, such as object elements, and behaviors, such as methods or subroutines, encapsulating an entity, may receive requests to communicate data, even if such request is received from a portion of control logic, or an object of logic, or a portion of a general purpose processor, or a specific purpose processor, or function, data structure, or instance of a class, or an ephemeral compilation of attributes, such as object elements, and behaviors, such as methods or subroutines, encapsulating an entity, that is contained within the same device. So, a mobile computing device may both send a request to communicate data with, for example, a remote mobile computing device, and may receive that sent request to communicate data with that remote mobile computing device. Alternatively, such requests can be sent from a mobile computing device, and can be received by another remote mobile computing device, a remote server, a remote processor, or the like, that receives the external request and processes it as described. A request could also be received from a remote mobile computing device, and also be received by that same remote mobile computing device, if a portion of that device receives the request for another portion of that device, utilizing sufficient control logic or processing.

Requests to communicate data can be one-way. Requests to communicate data can also be two-way. In a one-way request, one user makes a request to communicate data with one or more other RMCDs. The requesting user can target an RMCD and communicate data to that RMCD without that RMCD requesting to communicate data with the requesting user. A requesting devices in a one-way request to communicate data can be a remote mobile computing device. A requesting device in a one-way request to communicate data can be a fixed-location, wired, static, or other type of non-mobile device. In a two-way request, a first user targets a second user to communicate data with or to, and the second user targets the first user to communicate data with or to. The first and second user are then able to use the systems and methods to communicate data with each other. Requests can also be broadcast. For example, a user can target all or a subset of MCDs that have been or will be proximate a particular location around a particular time or time range, and communicate data to those MCDs. In such broadcast examples, criteria are likely to be used to narrow down the subset of MCDs with which to communicate data. A time that is around a time of a request may be at the time of a request, somewhat before that time, somewhat after that time, or some combination of those. A time that is around a time of a request is preferably context specific, such that in some examples, a time around a time of a request could be measured in milliseconds, in other examples in seconds, in other examples tens of seconds, and in other examples, longer, and possibly much longer, than tens of seconds. A time that is around a time of a request should be sufficient so that searches for location-based data of mobile computing devices proximate a determined location, and other such situations in which a time around a time of a request is used, are effective in finding potential target RMCDs that are likely to be relevant to a request to communicate data, and are likely to include actual targeted RMCDs.

Mobile Computing Device (MCD)

Mobile computing devices (MCDs) include mobile computers that generally include communication capabilities with hardware and software, whether that software be local, remote, or some combination of local and remote. Examples of mobile computing devices include: personal digital assistants (PDAs); enterprise digital assistants; smartphones; cameras; tablet computers; mobile and ultra-mobile computers; wearable computers; and imbedded computers. Of course, other types of mobile computing devices are also contemplated. Remote mobile computing devices (RMCDs) are MCDs that are remote from a user of interest or from another MCD or other type of device. Many mobile communications devices are also mobile computing devices.

Responses to Requests to Communicate Data, and Verification

There are many contemplated responses to received requests to communicate. One simple response indicates a desire to communicate data with a requestor. Another simple response indicates a refusal to communicate data with a requestor. Ignoring a request may also indicate a refusal to communicate data with a requestor. A more complicated response may be that additional information is requested or required for a receiver of a request to communicate data to decide whether to comply with such a request. Such additional information that a targeted, or even a potentially targeted, RMCD desires can take many forms, potentially including social relationship data, data on gender, age, education, residency, citizenship, marital or other personal relationship status, sexually transmitted infection status, languages spoken, tribal affiliations, places traveled, country or area of origin, rating, feedback, criminal records, recognitions, other connections, similarities, or differences between a requestor and such an RMCD, and many other types of information on which a user might wish to base, at least in part, a decision whether to accept or reject a request to communicate data, or to seek more information. Social relationship data can be traditional social relationships, such as friends on a social network such as Facebook, connections on a social network such as LinkedIn, circles on a social network such as Google Plus. Social relationship data can be less traditional, such as a third degree connection via more than one social network, for example, someone who is neither a Facebook friend nor a LinkedIn connection, but who is a friend of a Facebook friend or a Facebook friend of a third degree LinkedIn connection. Many such less traditional social relationships are contemplated. Additional social relationships could include more traditional contacts in an MCD's list of contacts, close or other type of friends of close or other types of friends on a social network, and others.

A requestor could similarly request, or require, that certain of the additional requested information be verified, for example by a trusted authority. Such trusted authorities can come in many forms. Real-time trusted authority, similar to Visa Inc.'s Verified by Visa system is one example for real-time verification. Other real-time verification systems attempt to determine, often by requiring a user to answer security questions in real time, whether that user is likely to be trusted. Stored verification systems are also contemplated. Predetermined verification systems are exemplified by, among many others, PayPal's verification system, CouchSurfing International Inc.'s verification system, and other such systems that attempt to collect and verify data about a user in advance, in order to increase the likelihood that the user presents true and accurate information in their dealings. For example, a trusted authority could verify, or provide verified data, that a requestor is in fact a twenty-seven year old male, with no criminal record, with a mailing address in a particular town. Many types of data verification are contemplated for various purposes including allowing a receiver of a request to communicate data to decide on a more informed basis whether or not to accept such a request, or whether any additional data is required to determine whether or not to accept such a request.

In addition to the responses described above, predetermined criteria can also be used, thus making such communication, or the process of determining if requests to communicate data, more efficient. For example, a user of an MCD could have predetermined, and potentially easily changeable, including changeable on the fly, criteria for requests to communicate data that would be acceptable, unacceptable, or require more information. Many such criteria are described above, and any of those criteria, or others, can form the basis of predetermined stored criteria for a user. One simple example is that a user might have a setting such that only people who have completed a four year university course might be able to request data communication with a user, or might be the only ones who's request to communicate data are accepted or passed on to a user's MCD to determine whether to accept, reject, or seek more information before deciding. More advanced settings, involving multiple criteria, some of which may be based on other set criteria, are also contemplated.

Determining a Location to be Searched

Certain aspects include steps of determining a location to be searched for potential target RMCDs. Several ways of determining such locations to be searched are contemplated. The simplest way may be for the systems or methods to receive sufficient data indicative of a location of a target RMCD, and to decide to use that data, potentially in the format received. More complicated ways to determine such locations are contemplated as well, and may involve calculations based upon one or more of, or all of, data indicative of a location of a target RMCD, data indicative of a location of a requesting RMCD, and data indicative of a time of a request. One example would be to receive data sufficient to identify a location of a requesting device, as well as data of a location of a target RMCD relative to a location of a requesting device at some time, and to calculate an absolute or relative location of the target RMCD. Data indicative of a location of a requesting or target MCD can be in many different forms, in different units of measurement, and in different coordinate systems. The systems and methods should be able to take different forms of input and determine locations to be searched, often with basic calculations, for example of locations and distances and/or trajectories, but sometimes with more complicated calculations.

Determined locations to be searched can be pinpoint locations, i.e. one specific identified location, and the search area around this pinpoint location would generally be some radius around that pinpoint. The pinpoint location need not, and often will not, be the exact location of a target RMCD, but can often serve to define the center of the area to be searched for target RMCDs. Determined locations to be searched can be general areas rather than pinpoint locations, for example, approximately ten meters from a requesting MCD in a certain direction. Determined locations can be trajectories. For example, if a target RMCD is associated with a moving vehicle, the location to be searched would change as a function of time. If the requesting RMCD is also moving, for example if it too is associated with a moving vehicle, the calculations for determining a location to be searched may take into account the location and/or trajectory of the requesting RMCD. For example, if a requesting RMCD is traveling at eighty miles per hour on a known, trackable, or determinable course, and the data indicative of a location of a target RMCD indicates that the target RMCD is traveling at a similar speed and trajectory to the requesting RMCD, except that it is located on a parallel path two lanes over and four vehicles ahead, then the determined location to be searched would be based at least in part on the trajectory of the requesting RMCD and the data indicative of a location of the target RMCD, along with data indicative of a time of the request that helps the system to identify the appropriate potential target RMCD.

Determined location can also be included in a request to communicate data. For example, if an MCD determines a location to be searched, that MCD can send data indicative of a location of a target RMCD in a variety of formats. Such formats can include specific GPS coordinates. Such formats can include coordinates of a geographic coordinate system, such as latitude and longitude, possibly with altitude. If an MCD stores location-based data in a suitable format, the system can determine a location to be searched by selecting the location that is passed from the MCD, potentially without changing the format or any aspects of that data.

Data Indicative of a Time of a Request

Aspects disclosed tend to included data indicative of a time of a request to communicate data. Such time indicative data can take many forms. One simple form is a received timestamp of a request to communicated data. Such a timestamp can be sent as part of a request to communicate data. Such a timestamp can also be estimated, calculated, or determined by the systems and methods. For example, an RMCD may send a request to communicate data with a target RMCD. Even if the request to communicate data doesn't specify a particular time of the request, if the systems or methods can take the request and apply a current timestamp, such as when the request to communicate data is received, such a current timestamp is said to be data indicative of a time of a request, and the request is said to comprise that data indicative of a time of a request. In such a case, the received data, even if it doesn't specify a time, is indicative of a time of a request because it is received at some time that can be determined, stored, and used to identify potential target RMCDs that are proximate a certain location around that time.

More complicated data indicative of a time of a request is also contemplated, including situations in which the time of a request is not the time at which the request is received by the systems or methods. For example, a user is sitting at a café, and wants to communicate data with a target RMCD. However, the user doesn't decide to send a request to communicate data until the target RMCD has already left the café. In such a situation, a user can send a request to communicate data, indicating a location that the target RMCD occupied previously. In such cases, the requesting user may also want to include data indicative of a time of a request, and that time would likely be sometime that the target RMCD was proximate the indicated location. Such a request to communicate data would then include data indicative of the fact that the target RMCD was at the indicated location several moments ago, or several minutes, hours, or days ago.

Data indicative of a time of a request that is prospective is also contemplated. For example, a user may be interested in communicating data with target RMCDs that will be proximate a particular location at some time in the future. Prospective times of requests can be used for a variety of reasons, including surveillance, investigations, and other situations in which a user may want to communicate with RMCDs that go to some location at some time in the future. For example, an advertiser may be very interested in RMCDs that spend a certain amount of time near a billboard, visual advertising display, holographic display, or any other type of media. After a poster is posted, such a user might request to communicate data with RMCDs that spend at least twenty seconds, or more or less time, even significantly, proximate an indicated location.

Data indicative of a time of a request that is retrospective is also contemplated. In such cases, users may be interesting in communicating data with target RMCDs that were proximate a particular location at some time in the past. One such example might be at a crime scene, where a crime has occurred and there may have been one or more RMCDs proximate that crime scene at a time of interest in the past. For an arson, for example, if forensic investigators are able to estimate a time window during which the fire was likely to be set, they can use the systems and methods to specify a time of a request that overlapped with the time window during which the fire was likely to be set.

Tracking RMCDs

Aspects are also contemplated that track and collect data about RMCDs, without requiring a request to communicate data with those RMCDs. Some such aspects may operate similarly to other disclosed aspects, where the request may be a request to track data related to a target RMCD rather than a request to communicate data with a target RMCD. In one simple example, a user might send a request to track a target RMCD, indicating a location of the target RMCD and a time during which tracking is desired. Differentiating data can of course be used in such aspects, without regard to whether it is included in the initial request, or is sought by the system or methods in order to help differentiate a potential target RMCD from proximate non-targeted RMCDs.

Returning to the café scene, a user might want to track a target RMCD in the café to see where the target RMCD goes at some determined time in the future, or has been at some determined time in the past. Such data might be particularly useful to advertisers, government agencies, and many other groups. One contemplated aspect relates to collecting data about where a target RMCD travels over a time period of interest, and other RMCDs with which that target RMCD is likely to be interacting. So, for example, once a target RMCD is identified, its movement can by tracked by accessing location-based data of the target RMCD over some period of time. Such an aspect could then generate a map or other data of the target RMCDs movements over time. Taking this aspect further, in addition to tracking where a target RMCD is over a period of time, location-based data can be accessed to identify other RMCDs that are proximately located over the same or a similar time period. With such data, a user can then have not only a map or other data related to movements of the target RMCD, but also some type of identification of other RMCDs that are proximate the target RMCD at different time periods. Such an aspect would then allow a user to track not only where a target RMCD travels, but with which other RMCDs that target RMCD spends time, and how much time, in each location that the target RMCD travels.

Privacy Concerns

Privacy concerns may be significant for some of the disclosed aspects. Privacy systems are contemplated that help to protect target RMCDs. Such privacy systems may allow a target RMCD to opt out, not participate, participate in a limited capacity, have controls of who or what can access its location-based data. In some cases, aspects may be advantageous to target RMCDs, as a target RMCD could offer access to some or all of its location-based data in exchange for some benefit, monetary or otherwise.

First

Aspects refer to first devices and first requests. The term 'first' does not necessarily connote first in time, and the term 'second' does not necessarily connote second in time. Rather, 'first' and 'second' are terms used to differentiate one from another, i.e., one device from another device or one request from another request.

Data Helpful to Determine Responsive Behavior

Some aspects include, in requests to communicate data, data about the device from which a request to communicate data was initiated, helpful for a target RMCD to determine appropriate responsive behavior. Responsive behavior from target RMCDs will sometimes depend on data about the requesting device. Data about a requesting device can include data about a user of a requesting device. Such data about a requesting device can increase the likelihood of a positive response from a target RMCD. For example, if a target RMCD is in the possession of a person wearing an article of clothing from a particular university, a requestor might include data indicative of the fact that the requestor also attended the same university, such data tending to increase the chances of positive responsive behavior from the target RMCD. The data that a requestor sends to a target, helpful for a target RMCD to determined appropriate responsive behavior, can be quite varied, and can include almost any kind and content of data that the requestor thinks may improve responses. Certified or verified such data is also contemplated. Such certified or verified data allows a target to better rely on the data being sent by a requestor, and to have a greater level of confidence that the data is likely to be true or accurate.

As will be realized, the systems and methods disclosed herein are capable of other and different embodiments and its several details may be capable of modifications in various respects, all without departing from the invention as set forth in the appended claims. Accordingly, the drawings and description are to be regarded as illustrative in nature and not in a restrictive or limiting sense with the scope of the application being indicated in the claims.

What is claimed is:

1. A method of facilitating data communication comprising:
  receiving a first request from a first remote mobile computing device to communicate data with a first unknown target remote mobile computing device, said first request comprising data indicative of a location of said first remote mobile computing device, data indicative of a location of said first unknown target remote mobile computing device, and data indicative of a time of said first request;
  storing first request data indicative of said first request, said first request data comprising data indicative of a location of said first remote mobile computing device, data indicative of a location of said first unknown target remote mobile computing device, and data indicative of a time of said first request;
  determining a location to be searched for first potential target remote mobile computing devices based at least in part on said data indicative of a location of said first unknown target remote mobile computing device;
  receiving a second request from a second remote mobile computing device to communicate data with a second unknown target remote mobile computing device, said second request comprising data indicative of a location of said second remote mobile computing device, data indicative of a location of said second unknown target remote mobile computing device, and data indicative of a time of said second request;
  storing second request data indicative of said second request, said second request data comprising data indicative of a location of said second remote mobile computing device, data indicative of a location of said second unknown target remote mobile computing device, and data indicative of a time of said second request;
  determining a location to be searched for second potential target remote mobile computing devices based at least in part on said data indicative of a location of said second unknown target remote mobile computing device;
  accessing stored location-based data of mobile computing devices proximate said determined location to be searched for first potential target remote mobile computing devices around a time of said first request;
  identifying one or more potential first target remote mobile computing devices proximate said determined location to be searched for first potential target remote mobile computing devices around a time of said first request, from said accessed stored location-based data of mobile computing devices proximate said location to be searched for first potential target remote mobile computing devices around a time of said first request;
  accessing stored location-based data of mobile computing devices proximate said determined location to be searched for second potential target remote mobile computing devices around a time of said second request;
  identifying one or more potential second target remote mobile computing devices proximate said location to be searched for second potential target remote mobile computing devices around a time of said second request from said accessed stored location-based data of mobile computing devices proximate said location to be searched for second potential target remote mobile computing devices around a time of said second request;
  matching at least two of said requests to communicate data, for which indicative data have been stored, where said one or more potential second target remote mobile computing devices includes said first remote mobile computing device, and where said one or more potential first target remote mobile computing devices includes said second remote mobile computing device; and
  communicating data, via more than one communications network, representative of at least one of: said first request to said second remote mobile computing device and said second request to said first remote mobile computing device.

2. The method of claim 1, wherein said first request further comprises first differentiating data, distinct from said data indicative of a location of said first remote mobile computing device, said data indicative of a location of said first unknown target remote mobile computing device, and said data indicative of a time of said first request, said differentiating data helping to differentiate said first unknown target remote mobile computing device from any proximate non-targeted remote mobile computing devices, and further comprising storing data indicative of said first differentiating data.

3. The method of claim 2, further comprising using at least some of said first differentiating data to help differentiate said first unknown target remote mobile computing device from any proximate non-targeted remote mobile computing devices.

4. The method of claim 1, further comprising communicating data representative of both of: said first request to said second remote mobile computing device and said second request to said first remote mobile computing device.

5. The method of claim 1, further comprising accessing stored criteria data indicative of predetermined criteria related to accepting or rejecting requests to communicate data, and further comprising using at least some of said accessed stored criteria data, at least in part, to help determine how to respond to a received request to communicate data.

6. The method of claim 1, further comprising:
  enabling further communications between said first remote mobile computing device and said second remote mobile computing device.

7. The method of claim 6, wherein said further communications enabled between said first remote mobile computing device and said second remote mobile computing device is direct communications.

8. The method of claim 6, wherein said further communications enabled between said first remote mobile computing device and said second remote mobile computing device is network-based communications.

9. The method of claim 1, wherein said determining a location to be searched for first potential target remote mobile computing devices is further based at least in part on said data indicative of a location of said first remote mobile computing device.

10. The method of claim 9, wherein said determining a location to be searched for first potential target remote mobile computing devices is based only on one or more of said data indicative of a location of said first target remote mobile computing device, said data indicative of a location of said first remote mobile computing device, and said data indicative of a time of said first request, along with any calculations based thereupon.

11. The method of claim 1, wherein determining said locations to be searched for said first and second potential target remote mobile computing devices is based only on one or more of said data indicative of a location of said first remote mobile computing device, said data indicative of a location of said first target remote mobile computing device, said data indicative of a time of said first request, said data indicative of a location of said second remote mobile computing device, said data indicative of a location of said second target remote mobile computing device, and said data indicative of a time of said second request, along with any calculations based thereupon.

12. The method of claim 1, wherein at least one of said requests to communicate data further comprises differentiating data, said differentiating data helping to differentiate at least one of said target remote mobile computing devices from any proximate non-targeted remote mobile computing devices, and wherein identifying one or more of said potential target remote mobile computing devices is further based at least in part on at least some of said differentiating data.

13. The method of claim 1, wherein at least one of said requests to communicate data further comprises data about the remote mobile computing device from which said request to communicate data was initiated, helpful for said respective target remote mobile computing device to determine appropriate response behavior.

14. The method of claim 1, wherein determining a location to be searched for said first potential target remote mobile computing device is based only on one or more of said data indicative of a location of said first remote mobile computing device, said data indicative of a location of said first target remote mobile computing device, and said data indicative of a time of said first request, along with any calculations based thereupon.

15. The method of claim 1, further comprising receiving from at least one of said remote mobile computing devices from which a request to communicate data is initiated additional data about said remote mobile computing device from which said request to communicate data is initiated, helpful for a respective target remote mobile computing device to determine appropriate responsive behavior, and further comprising communicating at least some of said additional data about said remote mobile computing device from which said request to communicate data is initiated to said respective target remote mobile computing device.

16. A system for facilitating data communication, the system comprising:
   a data receiver for receiving requests from remote mobile computing devices to communicate data with unknown target remote mobile computing devices, said requests to communicate data comprising data indicative of locations of requesting remote mobile computing devices, data indicative of locations of unknown target remote mobile computing devices, and data indicative of times of said requests;
   one or more databases for storing received request data, said received request data comprising said data indicative of locations of requesting remote mobile computing devices, said data indicative of locations of unknown target remote mobile computing devices, and said data indicative of times of said requests;
   control logic for determining locations to be searched for potential target remote mobile computing devices based at least in part on one or more of said data indicative of locations of requesting remote mobile computing devices, said data indicative of locations of unknown target remote mobile computing devices, and said data indicative of times of said requests;
   one or more databases of stored location-based data of mobile computing devices, including data indicative of mobile computing devices proximate at least some of said determined locations to be searched for potential target remote mobile computing devices;
   control logic for identifying one or more potential target remote mobile computing devices proximate at least some of said determined locations to be searched for potential target remote mobile computing devices around a time of respective said requests, based at least in part on said data indicative of mobile computing devices proximate said determined locations to be searched for potential target remote mobile computing devices; and
   a data transmitter for transmitting data representative of said requests to communicate data, via more than one communications network, to one or more potential target remote mobile computing devices.

17. The system of claim 16, wherein said control logic determines locations to be searched for potential target remote mobile computing devices based only on one or more of said data indicative of locations of requesting remote mobile computing devices, said data indicative of locations of target remote mobile computing devices, said data indicative of times of said requests, and any calculations based thereupon.

18. The system of claim 16, further comprising control logic for using differentiating data to help differentiate at least one of said target remote mobile computing devices from any proximate non-targeted remote mobile computing devices.

19. The system of claim 16, further comprising control logic for accessing stored criteria data indicative of predetermined criteria related to accepting or rejecting requests to communicate data.

20. The system of claim 16, where at least one request to communicate data further comprises data about the remote mobile computing device from which said at least one request to communicate data is initiated, helpful for a respective target remote mobile computing device to determine appropriate response behavior.

* * * * *